United States Patent [19]

Baumgartner

[11] Patent Number: 5,232,796
[45] Date of Patent: Aug. 3, 1993

[54] BATTERY WITH MULTIPLE POSITION HANDLE

[75] Inventor: Deborah S. Baumgartner, Prior Lake, Minn.

[73] Assignee: GNB Incorporated, Mendota Heights, Minn.

[21] Appl. No.: 762,580

[22] Filed: Sep. 19, 1991

[51] Int. Cl.$^5$ .................... H01M 2/10; A45F 5/00
[52] U.S. Cl. .................... 429/187; 429/175; 429/176; 16/DIG. 15; 16/114 R; 294/145; 294/169
[58] Field of Search .................... 429/187, 175, 176; 16/DIG. 15, 114 R; 294/145, 169, 903

[56] References Cited

U.S. PATENT DOCUMENTS 4,673,625 6/1987 McCartney .................... 429/187
5,024,904 6/1991 Curiel .................... 429/27

Primary Examiner—John S. Maples
Attorney, Agent, or Firm—Leydig, Voit & Mayer

[57] ABSTRACT

An electric storage battery is disclosed which includes a handle which can be locked in an upright position, such as for installation of the battery into a vehicle by robotics, yet where the handle can be then readily moved to a service position alongside the battery after installation into a vehicle, the container including a button and shaft for connection to apertures formed in the arms of the handle which provide an upright position and a service position, and locking in the upright position is achieved by a locking tongue formed on the container button which rests in a locking groove formed between locking tabs on the handle arms.

4 Claims, 3 Drawing Sheets

BATTERY WITH MULTIPLE POSITION HANDLE

FIELD OF THE INVENTION

This invention relates to handles for electric storage batteries.

BACKGROUND OF THE INVENTION

Starting, lighting and ignition (SLI) batteries such as are typically used in automotive, recreational and other applications are heavy, cumbersome and usually require two hands for carrying. The desirability of providing such batteries with attachable/detachable handles for facilitating carrying, placement and retrieval of such batteries has long been known. A variety of designs have been proposed. For example, U.S. Pat. No. 4,673,625 to McCartney et al. discloses a one-piece molded plastic handle which is attachable/detachable to the battery by displacement in a direction parallel to the end walls of the battery and which can pivot between a carrying position above the battery to a storage position alongside the battery.

Further, robotics are being used in a variety of applications in the automotive and recreational vehicle industry. In certain situations, it has been found desirable to utilize robotics to transport a battery from a supply source, such as a pallet, to the installed position in the vehicle. Utilizing robotics for such an application requires a handle that can be maintained in a position allowing enough space between the handle and cover for installation with the robotics, while, at the same time, allowing, after installation into the vehicle, the ability to readily move the handle to an out-of-the-way service position. Thus, a multiple-position handle is required since space in the vehicle (typically under-the-hood) is limited so that the upright position used for transporting the battery becomes unsuitable once the battery is installed in the vehicle. While the use of robotics is highly desirable, none of the existing handle designs can satisfy the diverse needs for applications of this type.

It is accordingly an object of the present invention to provide a battery and a handle wherein the handle is capable of being locked in an upright position and yet, after installation into a vehicle or the like, can be readily moved to a service position alongside the battery.

A further and more specific object of this invention is to provide a battery of this type wherein lifting the battery with the handle in the upright position enhances locking the handle in such upright position whereas an appropriate downward force on the handle allows the handle to be readily moved from the locked upright position to the service position.

Yet another object of the present invention is to provide a battery of this type wherein the container and handle can be readily molded from plastic materials conventionally used for lead-acid batteries.

A still further object of this invention provides a battery of this type wherein the handle can be easily manually assembled onto the battery and placed in the locked upright position.

Other objects and advantages will be apparent as the following description proceeds taken in conjunction with the accompanying drawings.

SUMMARY OF THE INVENTION

In accordance with the present invention, there is provided an electric storage battery including a container having side and end walls, a cover attached to the container and a handle having a central portion for transporting the battery and two arms for connection to the two side or two end walls of the container. The container and the handle have connection means which provide an upright position for the handle where the central portion of the handle is positioned above the cover of the battery for transporting and installing the battery and a service position wherein the central portion of the handle is positioned alongside the battery. A locking means is associated with the container and handle for locking the handle in the upright position, yet allowing the handle to be readily manually displaced from the locked upright position when it is desired, most typically after installation, to move the handle from the upright to the service position.

While the invention is susceptible of various modifications and alternative forms, specific embodiments thereof will be shown by way of example in the drawings and while hereinafter be described in detail. It should be understood, however, that it is not intended to limit the invention to the particular forms disclosed, but, on the contrary, the intention is to cover all modifications, equivalents and alternatives falling within the spirit and scope of the invention as expressed in independent claims.

DETAILED DESCRIPTION OF THE INVENTION

Figure 2:
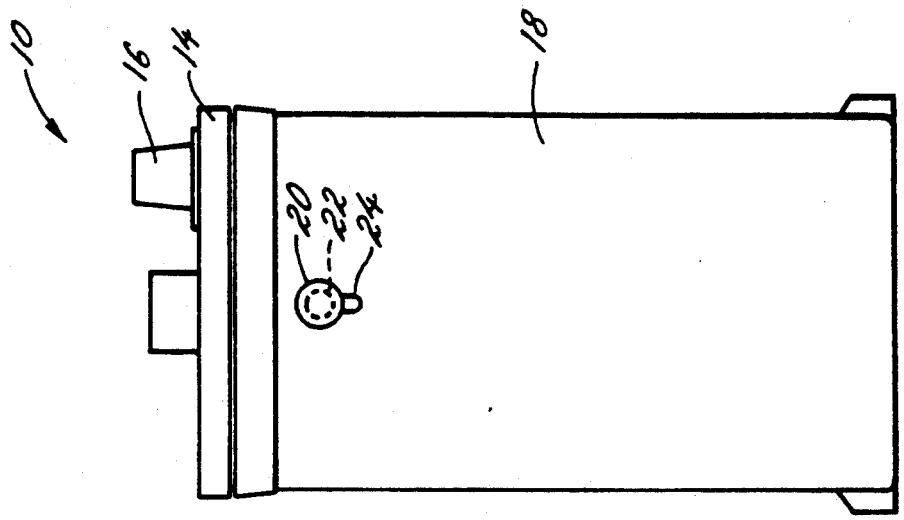
FIG. 2 is an end elevation view of the battery shown in FIG. 1 and further illustrating the handle connection and the container portion of the locking means.
Figure 1:
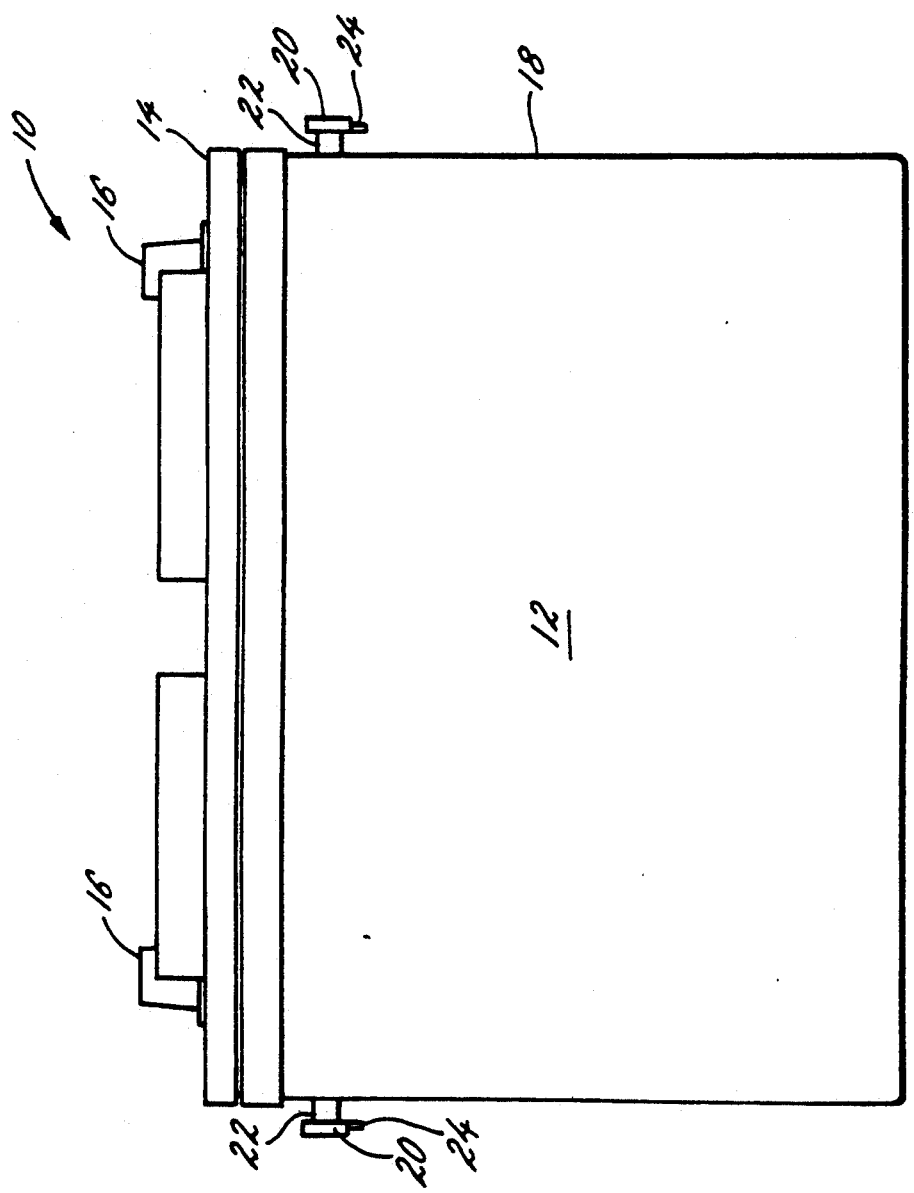
FIG. 1 is a side elevation view showing a preferred embodiment of a battery used in the present invention.

FIGS. 1 and 2 show a preferred embodiment of the battery of the present invention indicated generally at 10. The battery 10 includes a container 12 having a cover shown generally at 14 attached thereto by conventional means, and a pair of top terminals 16. The particular configuration of the terminals and the location can be varied as desired. Also, the plates, separators and other aspects of the internal configuration of the battery may be varied as desired. Numerous configurations are known in the art. Similarly, the terminal, container and cover configurations can be varied as desired.

The battery and handle that will be described herein are particularly suitable for use in conventional lead-acid electric storage batteries used for SLI applications, including automotive, recreational and other vehicles. In such applications, the batteries utilized are amenable to being installed by the use of robotics.

In accordance with one aspect of the present invention, each container end wall 18 has integrally formed thereon a connection means for cooperating with connection means on the handle to properly connect the handle to the container and locking means cooperating with locking means on the handle to lock the handle in an upright position. To this end, a button 20 is connected to the container 12 by shaft 22. As will be discussed hereinafter, button 20 and shaft 22 serve as the connection means for accepting a handle. The shaft is desirably dimensioned so that the handle slides comfortably between the container and the underside of the button as the handle is rotated. A locking tongue 24 downwardly depends from the button 20 and cooperates with means on the handle to ensure that the handle, upon assembly into the upright position, is locked in that position.

Figure 3:
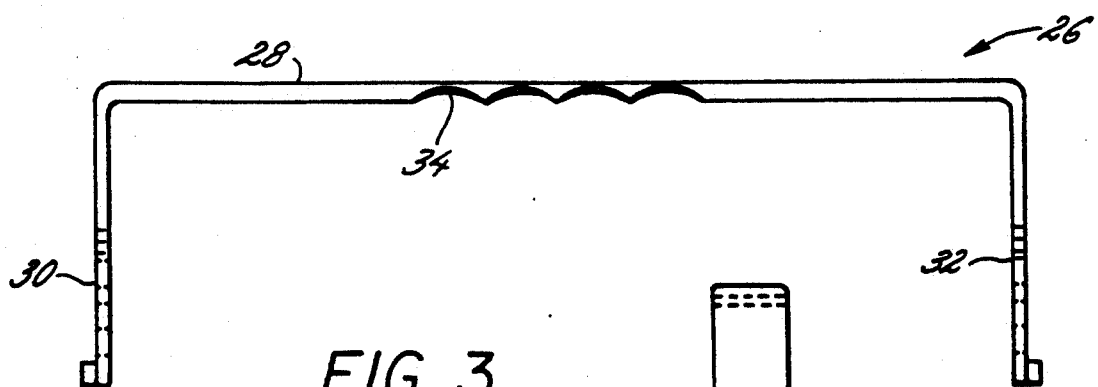
FIG. 3 is a side elevation view of one embodiment of a preferred handle in accordance with this invention.
Figure 4:
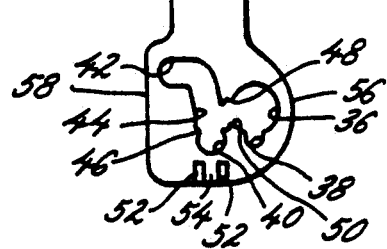
FIG. 4 is an end elevation view of the handle shown in FIG. 3.

FIGS. 3 and 4 show a preferred embodiment of a handle to be used with the battery shown in FIGS. 1 and 2. In general, the handle 26 comprises a central portion 28 and two downwardly depending arms 30 and 32. If desired, the central portion 28 may be formed with a gripping portion shown generally at 34 so as to assist in transporting the battery. The length of the arms 30 and 32 is selected such that the central portion 28 of the handle 26 will conveniently rest alongside the container when the handle 26 is rotated into the service position after installation into the vehicle.

Pursuant to one aspect of the present invention, the handle 26 includes connection and locking means which cooperate with the connection and locking mean of the container to allow the handle to be locked in an upright position, yet allow the handle to be readily rotated to its service position. A further and more specific aspect of the present invention lies in providing an entry position to facilitate ready assembly of the handle onto the container. To this end, the handle arms 30 and 32 each include an aperture shown generally at 36 which serves as the entry position for the handle during assembly. The entry position aperture 36 includes a tongue 38 and is oversized in comparison to the button 20 and locking tongue 24 of the container. Thus, as may be appreciated, during assembly, the handle can be easily slipped over the button 20 and the locking tongue 24 of the container, thereby positioning the handle arms 30 and 32 between the end walls 18 of the container 12 and the underside of the button 20.

The connection means on the handle includes the upright position aperture 40, service position aperture 42 and a connecting slide 44. The upright position aperture 40 and service position aperture 42 are sized to accommodate shaft 22. Exit from upright position aperture 40 is restricted due to the constrictions shown generally at 46. As can be seen in the illustrated embodiment, constrictions 46 comprise indentations that make the entrance into slide 44 somewhat smaller than the dimensions of shaft 22. However, the handle can be moved to the service position when that is desired by applying a downward force on the handle that causes the handle to flex so that the handle can move downwardly relative to the button 20 so as to position the shaft 22 in the slide 44. The constrictions restrict exit sufficiently so that the handle should not move out of position when that is not intended. Similarly, constrictions 48 in the slide or passageway 50 adjacent entry position aperture 36 ensures that the handle will not inadvertently be moved back into the entry position and slip out of connection with the battery.

Thus, after being placed in the entry position, assembly of the handle on the battery first involves moving the handle toward the right and then snapping the handle upwardly. This sequentially results in the location of the button and shaft relative to the handle moving down the slide 50 and then into the upright position aperture 40 in which the shaft 22 is held due to the constrictions 46.

Figure 5:
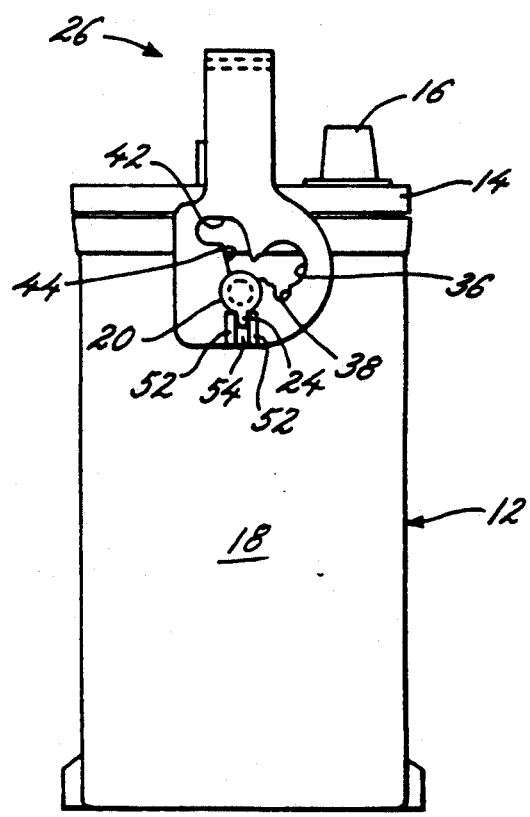
FIG. 5 is an end elevation view of the battery shown in FIG. 2 and illustrating the handle assembled in the locked upright position.

To hold the handle in the upright position, each of the handle arms 30 and 32 include a pair of locking tabs 52 which form a locking groove shown generally at 54. These locking tabs cooperate with the locking tongue 24 on the container to ensure that the handle is retained in the upright position. Thus, as is shown in FIG. 5, the locking tongue 24 of the container rests in a semi-press fit in the locking groove 54 formed by the handle locking tabs 52. The locking tongue 24 can accordingly be slid into the locking groove 54, but the fit is tight enough that the locking tongue 24 will stay in position. Upward movement, such as occurs when the battery is lifted, serves only to enhance the seating of the locking tongue 24 in the locking groove 54.

In accordance with a more specific and more preferred embodiment of the present invention, the handle arms are configured such that the two sides of the arms can be distinguished from one another. This allows assembly of the handle onto the battery container correctly and should eliminate inadvertent assembly of the handle backward from the position desired. In the illustrative embodiment, the entry position side of the handle arms 30 and 32 thus are curved as shown at 56 while the service position side is flat as shown at 58.

The handle may thus be assembled onto the battery by the manufacturer and then shipped in the locked upright position. When the user employs robotics to install the battery into the vehicle, no preparation is required; and the battery may be lifted directly from a pallet or the like into the installed position in the vehicle.

Figure 6:
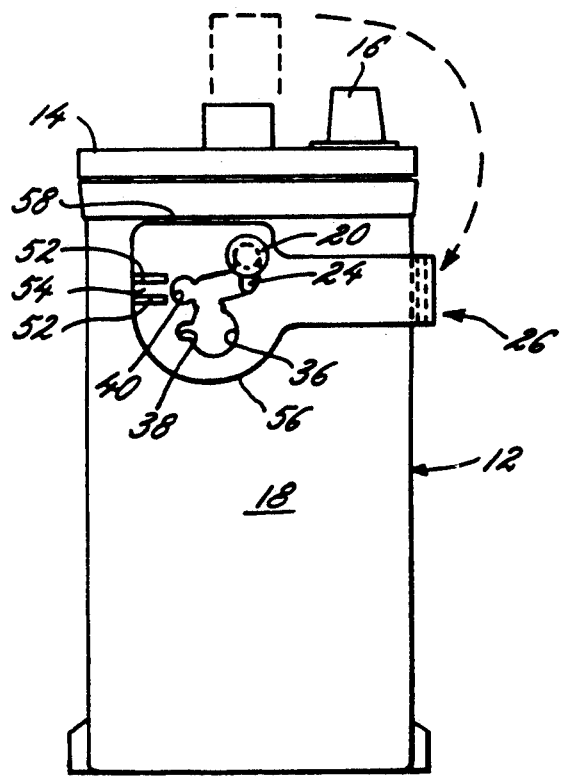
FIG. 6 is an end elevation view similar to FIG. 5, except showing the handle having been moved from the upright position to the service position alongside the battery.

Yet, after installation into the vehicle, the handle may be moved out of position into the service position where the central portion 28 rests alongside the battery. To move the handle to its service position, each end of the handle can be firmly hit with a downward motion which results in unseating the locking tongue 24 from the locking groove 54 as well as forcing the handle upwardly past the constrictions 46. Further downward rotation moves the container button 20 and shaft 22 relative to the handle upwardly along slide 44 and into the service aperture 42, as is shown in FIG. 6.

In the illustrative embodiment, the handle is connected to the end walls, as is perhaps the more conventional location where handles are used. However, if desired for some reason, the battery of this invention could be configured so that the handle is connected to the side walls of the container.

The container illustrated in FIGS. 1 and 2 can be readily molded of any desired plastic material, such as the propylene and ethylene-propylene copolymers typically used for battery containers. These materials can likewise be employed to mold the illustrated handle.

Figure 7:
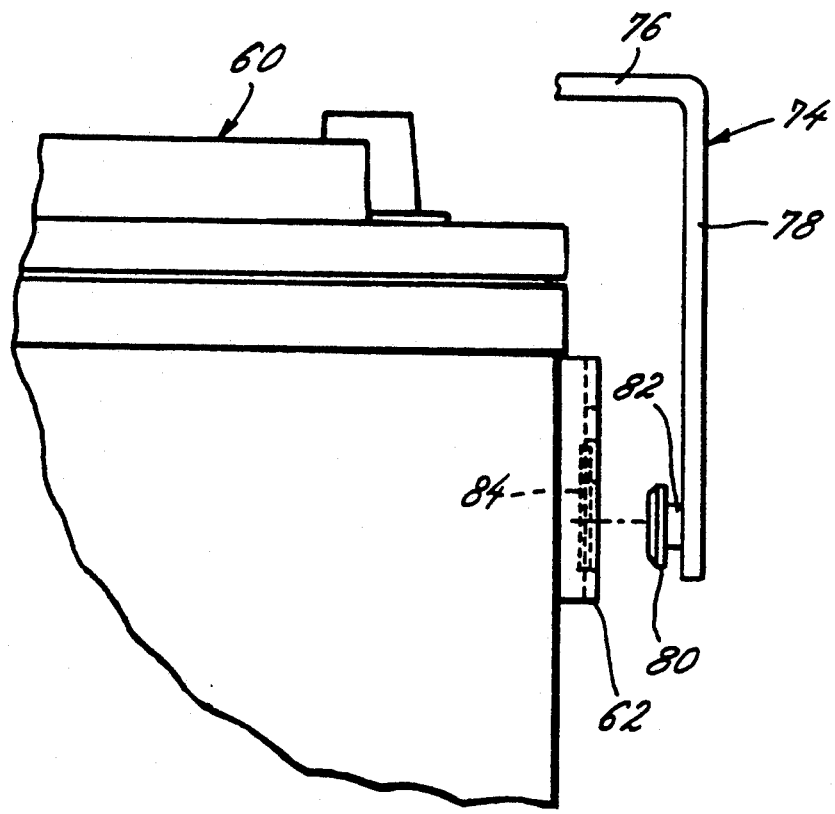
FIG. 7 is a fragmentary side elevation view of an alternative embodiment of a battery and handle in accordance with the present invention.
Figure 8:
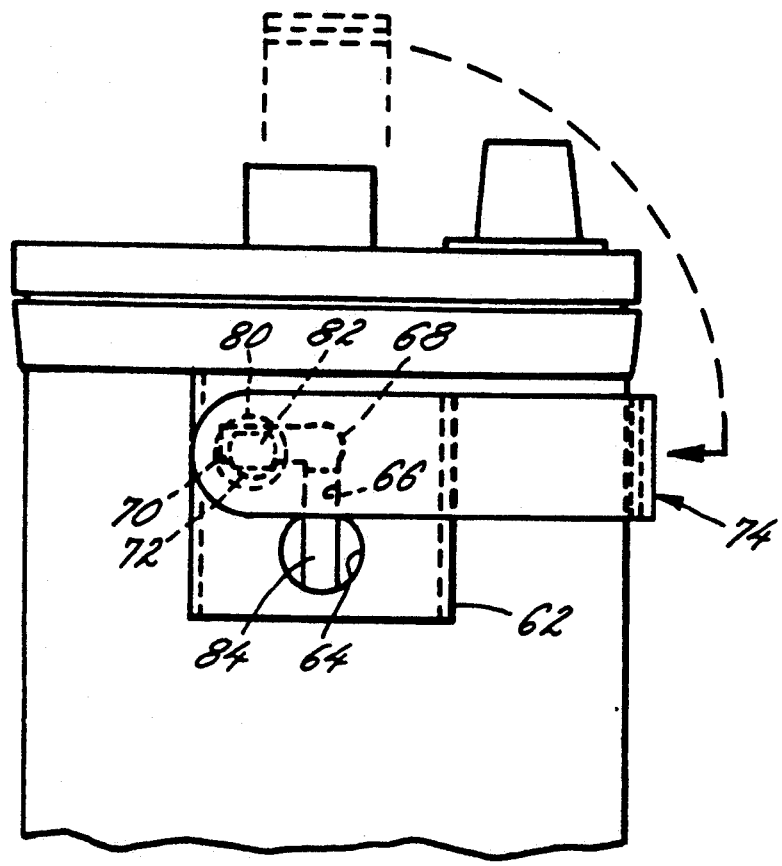
FIG. 8 is a fragmentary end elevation view of the battery and handle shown in FIG. 7 and illustrating the handle in the service position.

Pursuant to an alternative embodiment of the present invention, a similar functioning battery and handle could be configured by reversing the handle and battery container configurations from the preferred embodiment shown in FIGS. 1 through 6. In such an embodiment, the handle connection means will thus provide a button and a shaft while the entry and other positions are formed on the container side walls, such as by the use of a molded extension. FIGS. 7 and 8 thus show this alternative embodiment. This alternative embodiment may make the molding of the container more complicated than is the case with the preferred embodiment.

The container 60 shown in FIGS. 7 and 8 thus includes an extension shown generally at 62 which includes the entry position and other apertures and connecting slides, as well as the connection and locking means for the handle. The extension 62 thus has an entry position shown at 64, a slide or passageway 66 connecting the entry position to the upright position aperture 68, a slide 70 connecting the upright position aperture to a service position shown at 72.

In similar fashion to the preferred embodiment, the handle 74 comprises a central portion 76 and arms 78 (only one of which is shown). Each arm 78 includes a connection button 80 and a shaft 82.

In this embodiment, the relative positioning and movement from entry of the handle to the upright locked position and to the service position is somewhat different from that of the preferred embodiment. Entry into the upright position from the entry position is effected simply by an upward movement of the handle, but locking means must be provided to prevent the handle from falling down into the entry position 64. To this end, to lock the handle in the upright position, a tab 84 formed on container extension 62 is provided as best seen in FIG. 8. The tab 84 is sufficiently flexible so that the handle can be pulled into the upright position 68. In that position, the shaft 82 rests on the tab 84, thus preventing downward movement of the handle. The handle can then be moved into service position 72 simply by rotating and pushing the handle to the left along slide 70 until service position 72 is reached as shown in FIG. 8.

Thus, as has been seen, the present invention provides a battery and handle that can be assembled with the handle in a locked upright position, yet may be readily rotated to the service position when that is required.

The necessary container and handle can be molded quite readily, and assembly is straightforward.

What is claimed is:

1. An electric storage battery comprising a container having side and end walls, a cover attached to said container, a handle having a central portion for transporting the battery and two arms for connection to the container, container connection means on both the side or end walls of the container for connecting the handle arms to the container comprising a button and shaft connected to said container, handle connection means on the handle arms for connecting said arms to the container connection means comprising an upright position aperture including constriction means restricting movement of said shaft out of said upright position aperture, a service position aperture and a slide connecting said apertures, said slide being sized to accept said shaft and each of said handle arms being positioned between said button and the container wall, said container handle connection means providing an upright position where said central portion is positioned above said cover for transporting said battery and a service position wherein said central portion is positioned alongside said battery, and locking means associated with said container and handle for locking said handle in the upright position comprising a locking tongue downwardly depending from said button and a pair of locking tabs on each handle arm forming a locking groove therebetween, said locking groove being sized to accept and seat said locking tongue when said handle is in its upright position, said handle being capable of being manually displaced from the locked upright position and rotated to the service position.

2. The battery of claim 1 wherein said handle includes an entry position aperture configures to accept said button and locking tongue and a passageway connecting said entry position aperture to said slide.

3. The battery of claim 2 wherein said passageway includes constriction means restricting access of said button into said entry position aperture.

4. The battery of claim 3 wherein the handle arms have an entry position aperture side and a service position aperture side and the entry position aperture side is configured differently from the service position aperture side of at least one of the handle arms.

* * * * *